(No Model.) 4 Sheets—Sheet 1.
G. B. SICCARDI.
STREET SWEEPER.
No. 526,794. Patented Oct. 2, 1894.
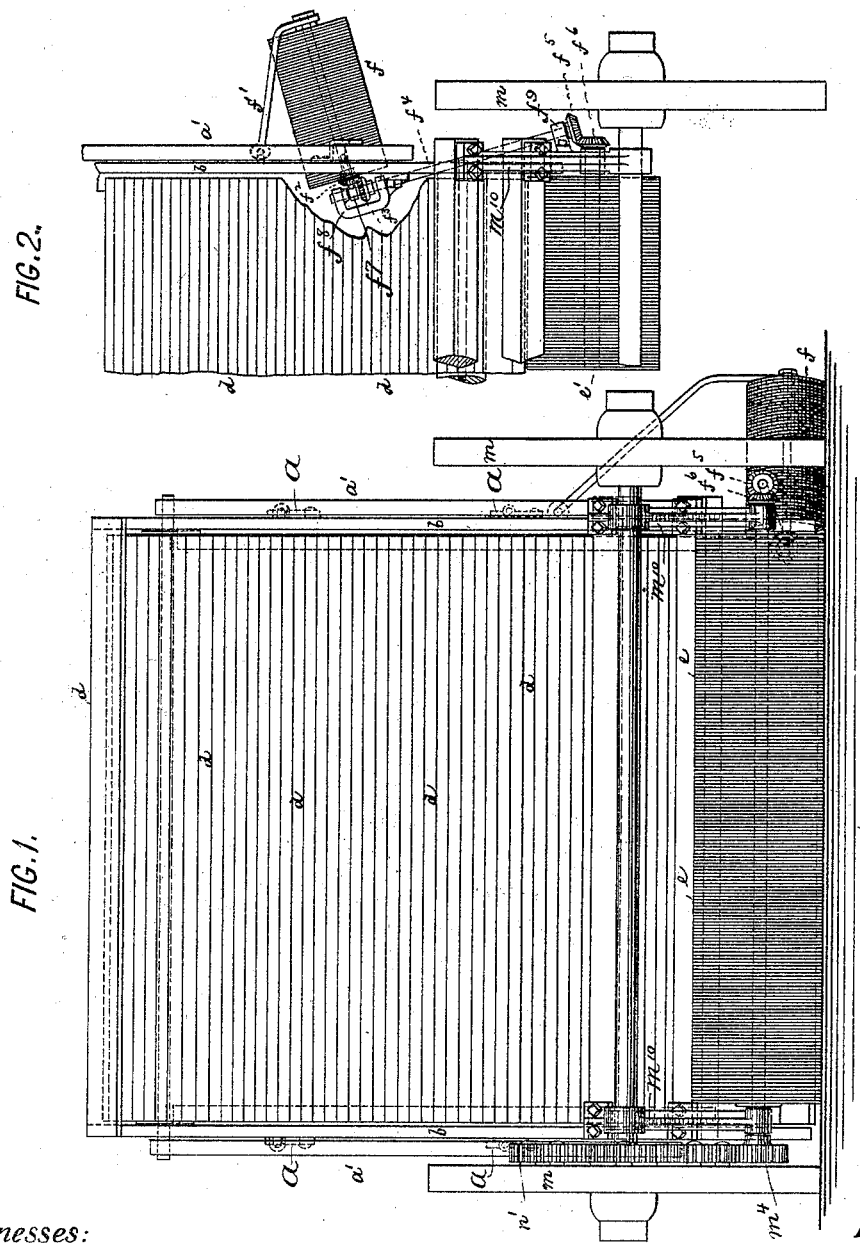
Witnesses:
John Becker
Theodore Becker
Inventor:
Giovanni B. Siccardi
by his attorneys
Roeder & Briesen (No Model.) 4 Sheets—Sheet 2.
G. B. SICCARDI.
STREET SWEEPER.
No. 526,794. Patented Oct. 2, 1894.
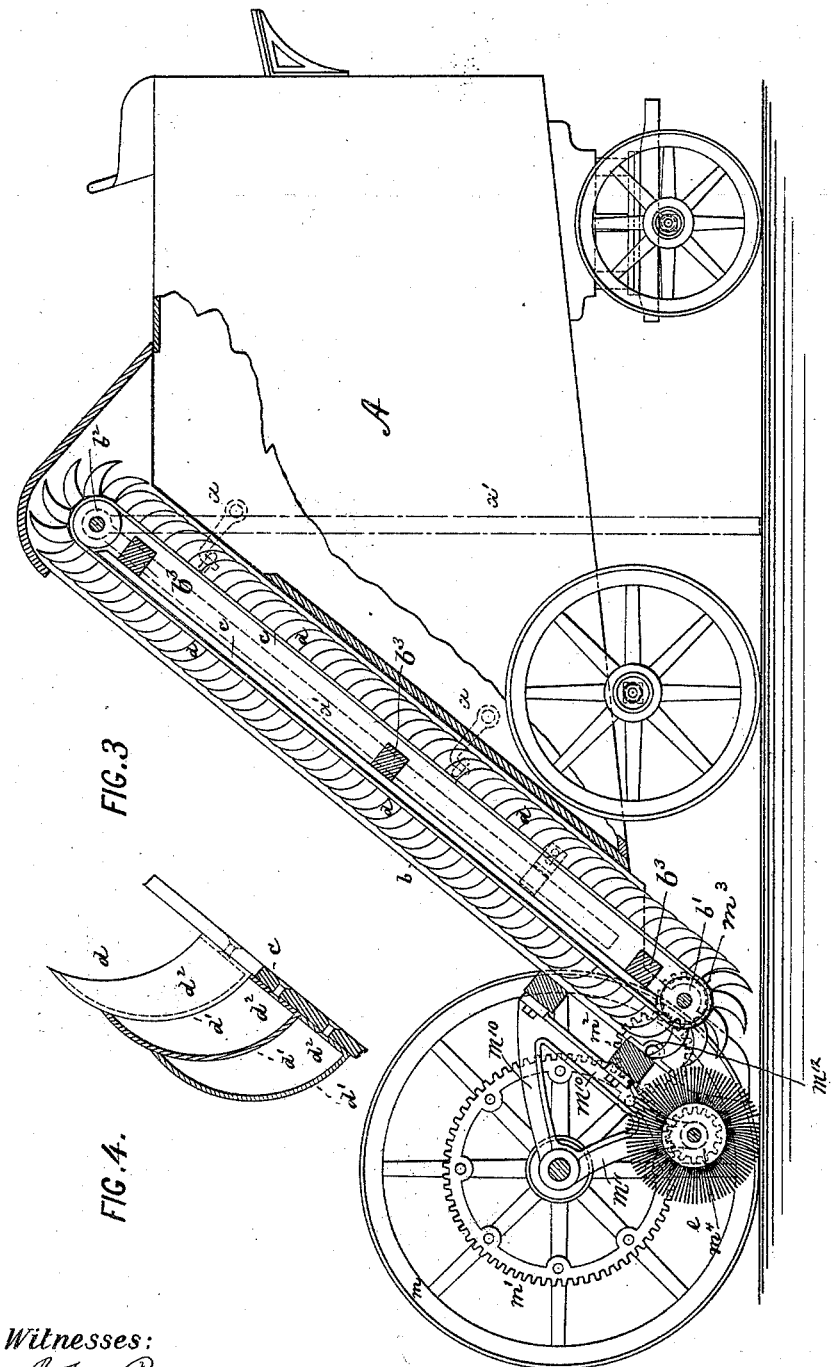
Witnesses:
John Becker
Theodore Becker
Inventor:
Giovanni B. Siccardi
by his attorneys
Roeder & Briesen

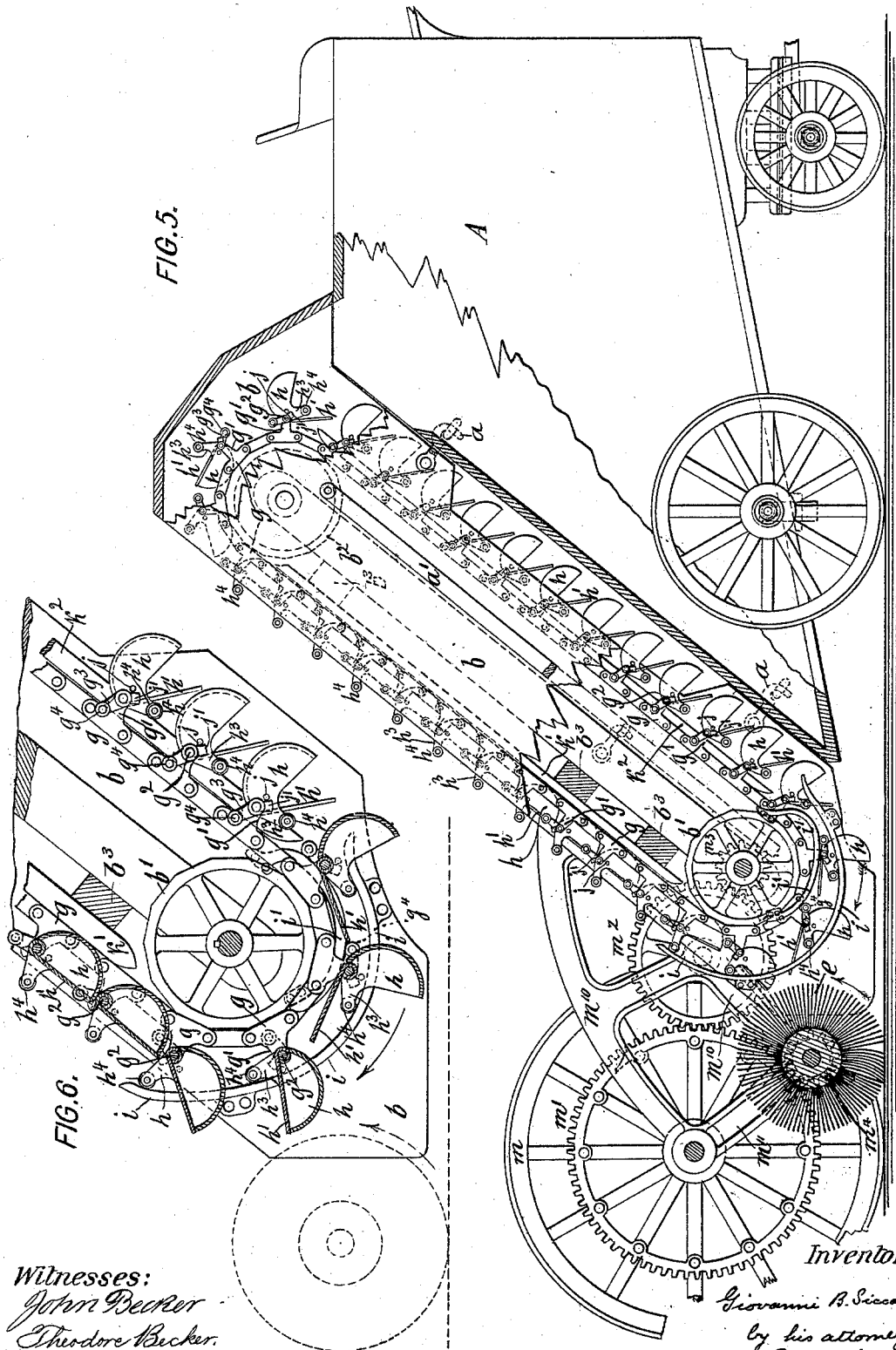

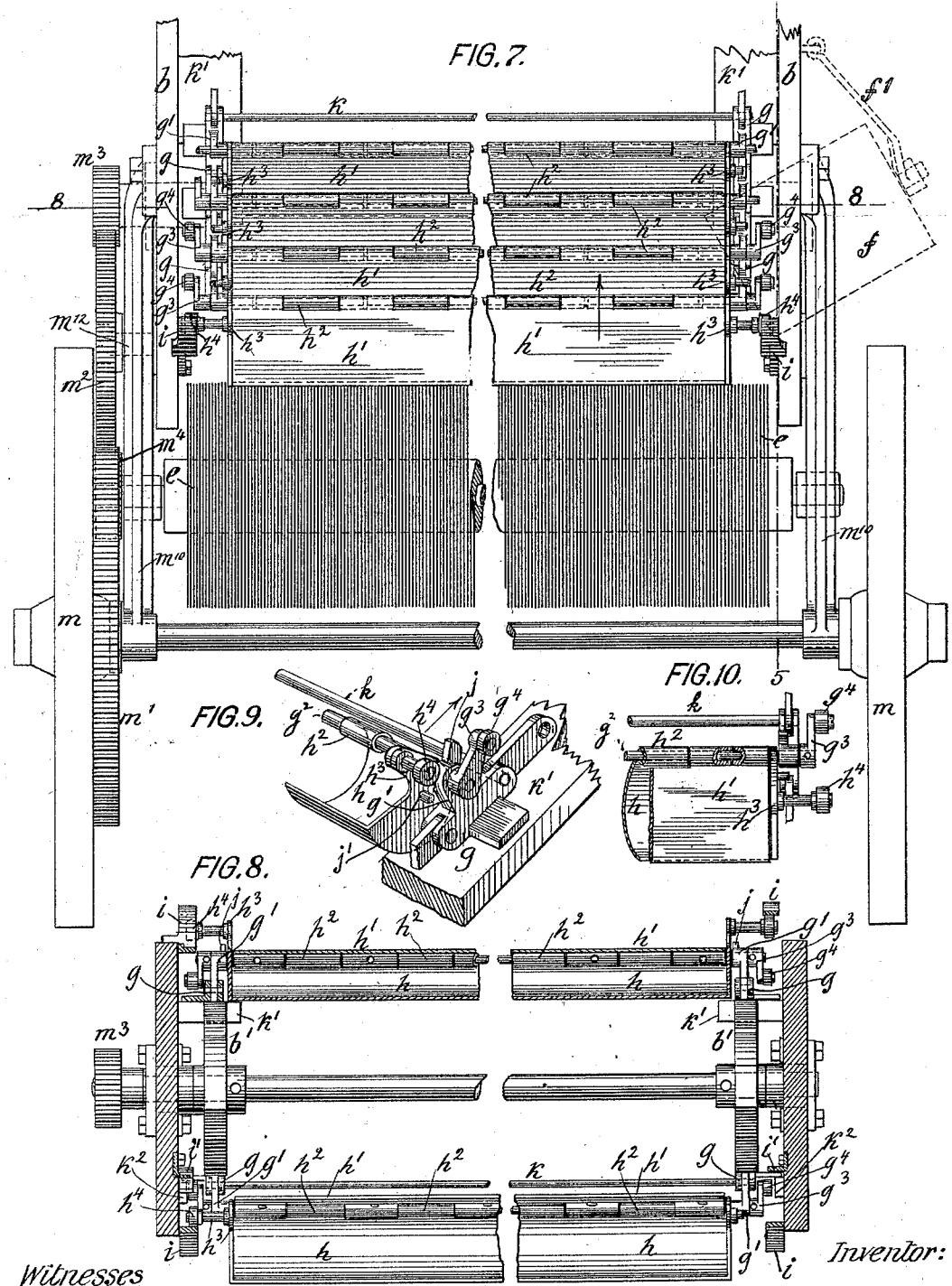

UNITED STATES PATENT OFFICE.

GIOVANNI B. SICCARDI, OF NEW YORK, N. Y.

STREET-SWEEPER.

SPECIFICATION forming part of Letters Patent No. 526,794, dated October 2, 1894.

Application filed May 7, 1894. Serial No. 510,338. (No model.)

*To all whom it may concern:*

Be it known that I, GIOVANNI B. SICCARDI, of New York city, New York, have invented an Improved Street-Sweeper, of which the following is a specification.

This invention relates to a street sweeper adapted to be attached to the end of a cart and to convey the sweepings into such cart. The sweeper is provided with a series of buckets secured to endless chains and adapted to automatically open while receiving and delivering their charge, and to automatically close while ascending, so as to confine their charge while conveying it from the street into the cart.

In the accompanying drawings: Figure 1 is an end elevation of my improved street sweeper. Fig. 2 is a plan of one side of the same; Fig. 3, a side elevation, partly in section; Fig. 4, a section through a series of buckets. Fig. 5 is a section of a modification on lines 5, 5, Fig. 7, partly in side elevation; Fig. 6, an enlarged sectional detail of the lower end of the sweeper shown in said modification; Fig. 7, a plan of the lower part of the same; Fig. 8, a section on line 8, 8, Fig. 7; Fig. 9, a detail perspective view of the mechanism for tilting the bucket shown in said modification, and Fig. 10 a detail plan partly in section thereof.

In Figs. 1 to 4, the letter A represents a cart having an inclined tail board to which my sweeper is adapted to be attached by hooks $a$, while when detached, it is supported by props $a'$.

The sweeper consists essentially of two side plates $b$, connected between their ends by cross beams $b^3$ and on top and bottom by drums or chain wheels $b'$, $b^2$, around which passes the endless chain or apron $c$. To this apron the buckets $d$, are attached. The peculiarity of these buckets consists in so shaping them, that the upper edge of one bucket will automatically close against the bottom of the next adjoining bucket. To this effect, the bottom plates $d'$, of the buckets are curved and the end plates $d^2$, have a correspondingly curved upper edge. As the endless apron is revolved, the buckets will close tightly against each other, to confine their charge, excepting when they pass around the drums $b'$, $b^2$, when they will automatically open to receive and to deliver such charge.

The apron is driven from one of the wheels $m$, having a gear wheel $m'$, that meshes into intermediate wheel $m^2$, which in turn meshes into cog wheel $m^3$, fast on shaft of drum $b'$. The wheel $m'$, is secured to the spokes of wheel $m$, while the wheel $m^2$, is mounted on a stud $m^{12}$, secured to to the side plates $b$. The gear wheel $m'$, also revolves a brush $e$, by gear wheel $m^4$.

The shaft $e'$, of the brush $e$, is hung in an arm $m^{11}$, of a frame $m^{10}$, which constitutes a bearing for the shaft of wheel $m$, and which is connected to the side plates $b$.

In addition to the main brush $e$, I employ an auxiliary brush $f$, which is adapted to reach and sweep the gutter. This brush projects laterally beyond the wheel $m$, and is placed obliquely in front of the same. It is supported at its outer end by a swinging arm $f'$, that projects downwardly from the outer side piece $b$. At its inner end it is hung by means of a swiveled eye $f^7$, upon a shaft $f^4$, with which it is intergeared by bevel wheels $f^2, f^3$. The shaft $f^4$, revolves at its forward end in a hanger $f^8$, secured to side plate $b$, and at its rear end in a bearing $f^9$. The rear end of the shaft $f^4$, is intergeared by bevel gear $f^5$, $f^6$, with the shaft $e'$, of the main brush $e$. The auxiliary brush will in this way throw the contents of the gutter into the line of travel of the main brush, to be conveyed by the same into the buckets and thence into the cart.

In Figs. 5 to 10, the automatic opening and closing action of the buckets is obtained in a different manner. Here two endless chains pass around the drums or wheels $b'$, $b^2$, each chain being composed of pivotally connected links $g$, having outwardly projecting arms $g'$. The arms $g'$, of the two links which are horizontally in line with each other, are connected by pivot pins $g^2$, to which the covers $h'$, of the buckets $h$, are rigidly connected. The buckets themselves have a tubular sleeve or knuckle $h^2$, that surrounds and turns loosely upon pin $g^2$. To the pivot $g^2$ is connected an arm $g^3$, carrying a roller $g^4$. The buckets $h$, are provided with arms $h^3$, provided with similar rollers $h^4$.

To the lower end of the side plates $b$, there are secured beneath wheels $b'$, the eccentric guide rails $i$, $i'$, of which the lower rail $i$, is adapted to be engaged by the bucket-rollers $h^4$, while the upper rail $i'$, is adapted to be engaged by the cover-rollers $g^4$. As the chain ascends, the buckets and covers tilt backward by gravity and thus the buckets are closed to confine their charge. As the buckets round the upper drum $b^2$, they tilt forward while the covers drop down, so that the sweepings are dumped into the cart. The buckets are provided with an arm $j$, adapted to come into contact with a stop $j'$, on link arm $g'$, so that as the buckets tilt forward, they will be maintained in their open position, without falling upon their covers. As soon as the buckets begin to round the lower drum $b'$, their rollers $h^4$, will engage the rail $i$, and will by this rail be held at an angle to properly receive their charge from brush $e$. After the buckets have been charged, the rollers $h^4$, leave the rail $i$, so that the buckets are free to fall back by gravity.

During the time the rollers $h^4$, have engaged the rail $i$, the rollers $g^4$, of the covers $h'$, have engaged the rail $i'$. This latter engagement will cause the covers to be held wide open, so as not to obstruct the free admission of the sweepings into the buckets. As soon as the rollers $g^4$, have cleared the rail $i'$, the covers will fall down upon the buckets by gravity, so as to close the same, during their ascent, as already described.

In order to stiffen the entire structure, the chain links $g$, are connected at suitable intervals by the rods $k$, while the chains themselves are prevented from sagging by guard rails $k'$, $k^2$.

The advantages connected with my sweeper are that it will collect the sweepings from the street up to the curb stone, and that it will convey the same into the cart without creating dust. At the same time all hoods that inclose the buckets and render them inaccessible for repair, &c., are dispensed with.

What I claim is—

1. A street sweeper consisting of a pair of side plates, fastenings for securing the same to the tail board of a cart, a revolving brush, an endless conveyer, a pair of drums around which the conveyer travels, and buckets secured to the conveyer and adapted to close automatically upon ascending and descending, and to open automatically upon rounding the drums, substantially as specified.

2. The combination of a sweeping brush with an upper and lower drum, chains passing around the same, buckets and covers pivoted thereto, rollers secured to the buckets and covers, and eccentric rails adapted to engage said rollers and to tilt the buckets and covers while rounding the lower drum, substantially as specified.

3. The combination of an upper and a lower drum with links $g$, having arms $g'$, pivot pins $g^2$, covers $h'$, rigidly connected thereto, buckets $h$, turning loosely on the pivot pins, arms $j$, stops $j'$, rollers $g^4$, $h^4$, secured to the covers and buckets respectively, and with eccentric rails $i'$, $i$, adapted to be engaged by said rollers and thereby tilt the buckets and covers, substantially as specified.

GIOVANNI B. SICCARDI.

Witnesses:
F. V. BRIESEN,
WM. SCHULZ.